United States Patent Office 2,875,691
Patented Mar. 3, 1959

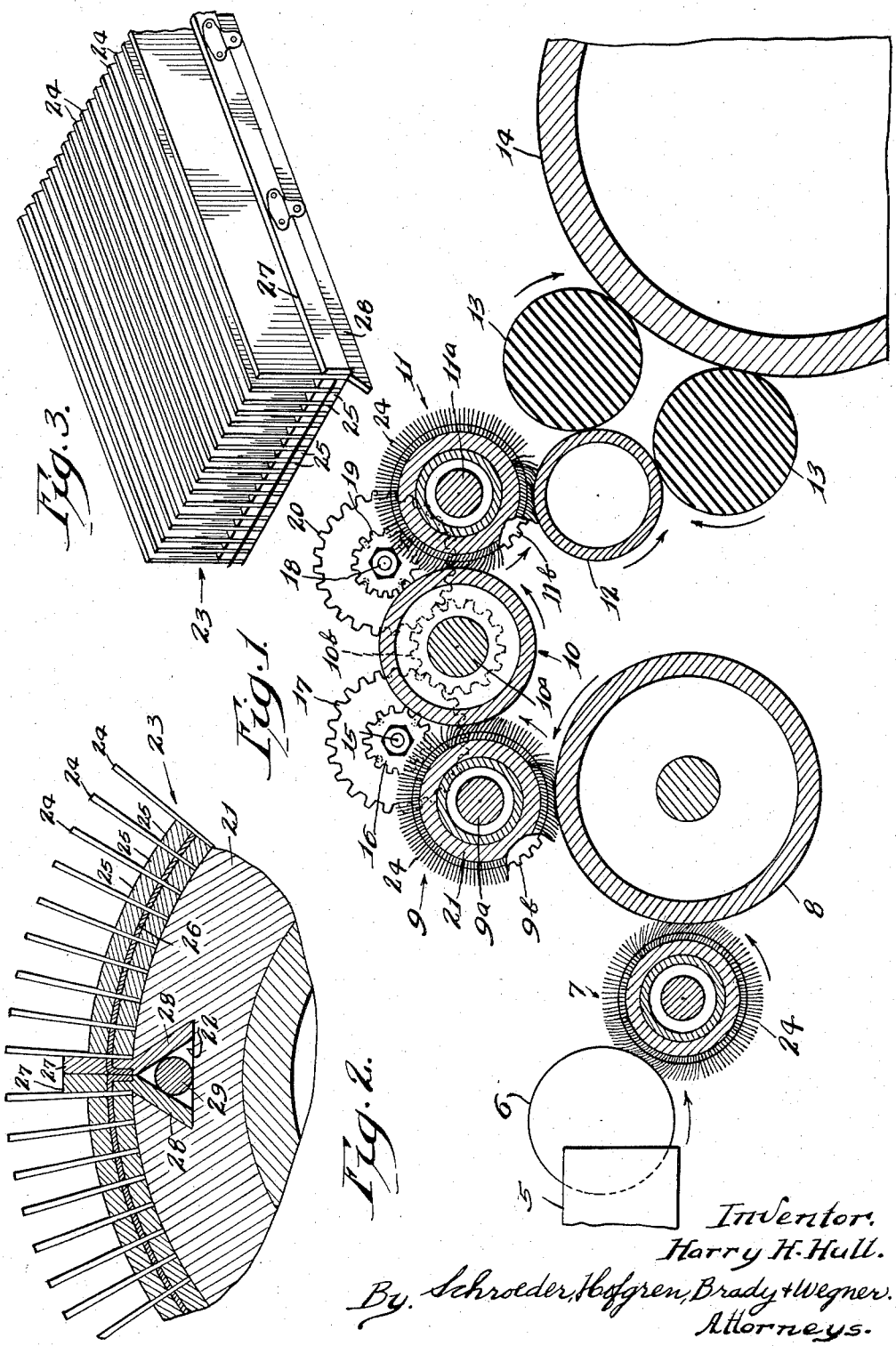

2,875,691

INKING SYSTEM FOR ROTARY PRINTING PRESSES

Harry H. Hull, Homewood, Ill., assignor to R. R. Donnelley & Sons Company, a corporation of Delaware Application November 16, 1956, Serial No. 622,558

11 Claims. (Cl. 101—350)

This invention relates to an improved inking system for rotary printing presses, and in particular it relates to an inking system in which rollers having radially oriented flexible fins are interspersed with the steel or rubber covered rollers conventionally used in ink carriages.

A common inking system for rotary printing presses has a fountain roller which takes ink from an ink fountain and passes it to a ductor roller which, in turn, applies the ink to the surface of a steel distributor roll. A rubber roller in contact with the distributor roll picks up the ink and carries it to a conveyor roll which ordinarily is axially reciprocated to spread the ink film. From this conveyor roll the ink is picked up by a second rubber surfaced roll and thence by another longitudinally reciprocating conveyor roll which, in turn, applies the ink to the form rolls which are in contact with the printing plates on the plate cylinder.

The operation of a conventional inking system as above described requires that the steel conveyor rolls be driven at a surface speed of about 1,000 feet per minute with the rubber rolls driven off the steel rolls as idlers. There are certain inherent difficulties in the use of contacting steel and rubber rollers in a press inking system; and the elimination of any direct contact between such rollers by placing fin rollers at appropriate points eliminates many of the more difficult problems.

In the first place, for proper ink distribution it is necessary for the rubber rolls to be adjusted so that they run with approximately a ⅜″ flat surface in contact with the vibratory conveyor rolls. The surfaces of both rolls are, of course, coated with a highly viscous ink paste so that the relative movement between the axially reciprocating steel rolls and the non-reciprocating rubber rolls places tremendous tensile strains upon the rubber roll surfaces. Also, the mechanical working back and forth in the viscous ink surface generates a considerable amount of heat so that the rollers must have internal water pipes for cooling.

In spite of any cooling of the steel rolls, there is considerable expansion of the rollers due to heating as a press run progresses, and this necessitates the stopping of the run after a period of time to reset the rubber rolls so as to maintain the ⅜″ flat area between the rubber roll and each vibratory roll.

All of the foregoing difficulties are largely eliminated by the use of fin rolls as herein described. The flexibility of fins makes it a great deal easier to adjust the fin rolls correctly with respect to the rolls with which they are in contact; and there is, of course, an enormous reduction in surface friction which reduces heating considerably. There is no need to reset the fin rolls after a period of operation, as is the case where rubber and steel rolls are operated in contact with one another.

Furthermore, the rubber rolls used for this purpose are necessarily tapered slightly toward the ends, so that it is difficult to maintain proper contact from end to end of the rolls. On the other hand, with fin rolls there is no need to taper the discontinuous circumferential surface formed by the outermost extremities of the fins. This provides more uniform distribution from end to end of the rolls with which the fin rolls are in contact.

The rolls with which the fin rolls are used may be either the conventional steel rolls or rubber surfaced rolls. Preferably the roll arrangement is such that there is no direct contact between two rolls having continuous surfaces except for the contact between the ductor roll and first distributor roll, and the contact between the last ink conveyor roll and the form rolls which directly apply the ink to the printing plates on a plate cylinder.

Two phenomena which are encountered in the use of ordinary inking equipment are "ghosting" and "starvation" of ink. When ghosting takes place, the impression of the printing plate is carried by the form roller back through the distributor rollers and produces an uneven ink surface so that subsequent impressions may not be uniform. Ink starvation is a non-uniform distribution of ink due to insufficient working between the rubber rolls and the vibratory steel rolls. A discontinuous surface, such as is provided by a fin roll, greatly reduces the likelihood of ghosting and ink starvation.

Furthermore, on those occasions when the paper web breaks it is often frictionally carried by the viscous ink surface on the form roll back through the vibratory rolls and the rubber rolls for some distance before the press can be stopped. Clearing such a "rewind" is greatly simpler with fin rolls than it is with solid rolls.

Operating costs are reduced and rate of operation may be increased by the elimination of direct contact between steel and rubber rolls. In a conventional system the rubber surface of the roll may be peeled off by the tremendous forces set up by the viscous ink surface. Roll wear and roll damage are a major cost factor in the use of conventional inking systems in which rubber rolls and steel rolls are in direct surface contact. These problems are also eliminated where fin rolls are used. Furthermore, the elimination of a considerable part of the frictional resistance means that less power is required to drive the inking system, so with the same motor a considerably higher press speed may be achieved.

For proper ink distribution with fin rolls, it is necessary that the fin rolls be driven in such a way that their flexible fins sweep the surfaces of the rolls with which they are in contact. This may be accomplished by driving the fin rolls independently at a different rate of speed from the rolls with which they are in contact, and preferably the fin rolls are so driven that the movement of the fins is opposite to that of the roll surfaces which are brushed by the fins.

While the use of fin rolls is most advantageous in the ink carriage as heretofore described, such a roll also possesses substantial advantages in place of the conventional ductor roll.

Ductor rolls usually are mounted to reciprocate between the fountain roller and the distributor roll, so that the latter roll receives small increments of ink intermittently from the ductor. The use of a fin roll, with its flexible, discontinuous surface, permits each fin to transfer an increment of ink to the distributor roll. This eliminates the usual reciprocating mechanism for the ductor roll, and cuts out the starting and stopping of the ductor as it moves back and forth. Superior application of ink to the distributor roll is provided with simpler mechanism.

The invention is illustrated in a preferred embodiment in the accompanying drawings in which:

Fig. 1 is a diagrammatic showing of an inking system employing fin rolls;

Fig. 2 is a fragmentary sectional view on an enlarged scale showing the mechanism for attaching the fins to the outer surface of a roll; and Fig. 3 is a fragmentary perspective view of a fin assembly detached from the roll.

Referring to the drawings in greater detail, and referring first to Fig. 1, the inking system includes an ink fountain 5, a fountain roll 6, a fin ductor roll 7, and a distributor roll 8, all said rolls being driven counterclockwise as indicated by the arrows adjacent the several rolls. As illustrated, the fin ductor roll 7 is permanently in contact with the surface of the fountain roll 6 and distributor roll which is practical with a fin ductor. The ink fountain 5, fountain roll 6, and fin ductor roll 7 cooperate to apply ink to the distributor roll 8. In accordance with common practice, the fountain roll may be driven at 6 to 12 R. P. M., the fin ductor roll at 40 to 60 R. P. M., and the distributor roll at about 368 R. P. M.

The balance of the inking system includes a first fin roll indicated generally at 9, a first vibratory roll indicated generally at 10, a second fin roll indicated generally at 11, a second vibratory roll 12, and a pair of form rolls 13 which transfer ink from the roll 12 to the surfaces of elements on a cylinder 14 which are to be inked for printing. Such elements may be plates for black and white or color, or offset material. The several rolls numbered 9 to 13 are rotated in the directions indicated by the various arrows in Fig. 1.

The drive for the rolls is provided by suitable gearing on the various roll shafts. Thus, the first fin roll 9 is mounted on a shaft 9a which is provided at one end with a gear 9b, and a drive shaft 15 is provided with a small gear 16 meshing with the gear 9b. The first vibratory roll 10 is mounted on a shaft 10a which has at one end a gear 10b meshing with a large drive gear 17 on drive shaft 15. Second fin roll 11 is mounted on a shaft 11a which also carries a gear 11b; while an idler shaft 18 is provided with a small gear 19 which meshes with the gear 11b and has a gear 20 which meshes with the gear 10b on the shaft for the first vibratory roll 10 to drive the shaft 18. The second vibratory roll 12 may be driven by suitable gears (not shown), and the form rolls 13 are frictionally driven as idlers off the second vibratory roll 12.

As shown in Fig. 1, the distributor roll 8, the vibratory rolls 10 and 12, and the fin rolls 9 and 11 all rotate counterclockwise so that the surfaces of the fin rolls move counter to the direction of surface movement of the rolls 8, 10, and 12. The fin rolls are also driven at a substantially slower speed than the rolls 8, 10, and 12; so that, for example, where the roll 8 may be rotated at 368 R. P. M. and the rolls 10 and 12 at about 706 R. P. M., the fin rolls 9 and 11 may be rotated at 158 R. P. M. The vibratory conveyor rolls 10 and 12 are axially reciprocated for a distance of about 1½ inches.

As seen in Figs. 2 and 3, the construction of the fin rolls 9 and 11 includes a rigid drum 21 mounted on the roll shaft which is provided with a longitudinal keyway 22. A fin assembly, indicated generally at 23, consists of a plurality of fin members 24 which are separated by spacer members 25, and the assembly of fins and spacer members is held together by a plurality of straps 26 which extend through aligned openings in the fins and the spacer members. At the two ends of the fin assembly 23 are end bars 27 within which the ends of the straps 26 are securely fastened, and the end members include inclined locking plates 28 which are adapted to set in the keyway 22 of the drum 21 and be retained therein by means of a removable locking rod 29.

The fins 24 may be of metal or plastic, and are sufficiently thin and flexible that, as seen in Fig. 1, they may bend a substantial distance when they are swept across the surface of an adjacent roller, and the fin surfaces may thus drag across the ink on the rollers with which the fins are in contact so as to adequately spread and work the ink.

As used herein, the term "rotary press" should be understood to mean any press in which ink is applied to a rotating cylinder, whether this be in a press which is known technically in the trade as a rotary press, or in a multi-color or offset press.

The foregoing detailed description is given for clearness of understanding only and no unnecessary limitations are to be understood therefrom, as modifications will be obvious to those skilled in the art.

I claim:

1. In an inking system for rotary printing presses: a distributor roll; means for applying ink to said distributor roll; a fin roll, said fin roll having a mass of closely circumferentially spaced, longitudinally elongated, flexible, normally radial fins, a plurality of said fins being in contact with said distributor roll at all times; a conveyor roll in contact with a plurality of fins on said fin roll; and drive means for rotating said rolls so that the fins sweep the surface of the distributor roll and the conveyor roll.

2. The inking system of claim 1 in which the drive means rotates the fin roll so that the fins move counter to the surface movement of the conveyor roll.

3. The inking system of claim 2 in which the drive means rotates the fin roll at a slower speed than the conveyor roll.

4. The inking system of claim 1 in which the drive means rotates the fin roll at a slower speed than the conveyor roll.

5. The inking system of claim 1 in which the fins on the fin roll extend continuously for the entire length of said roll.

6. In an inking system for rotary printing presses: a distributor roll; means for applying ink to said distributor roll; a conveyor roll spaced from the distributor roll; a fin roll, said fin roll having a mass of closely circumferentially spaced, longitudinally elongated, flexible, normally radial fins, a plurality of said fins being in contact with said distributor roll and said conveyor roll at all times; and drive means for rotating said rolls so that the fins sweep the surfaces of said distributor roll and said conveyor roll.

7. The inking system of claim 6 in which the drive means rotates the distributor roll and the conveyor roll in the same direction, and rotates the fin roll so that the fins move counter to the surface movement of said distributor roll and said conveyor roll.

8. In an inking system for rotary printing presses: a first axially reciprocal conveyor roll; means for applying ink to said conveyor roll; a second axially reciprocal conveyor roll; a fin roll, said fin roll having a mass of closely circumferentially spaced, longitudinally elongated, flexible, normally radial fins, a plurality of said fins being in contact with both said rolls; vibratory means for axially reciprocating both said conveyor rolls; and drive means for rotating said rolls so that the fins sweep the surfaces of both conveyor rolls.

9. The inking system of claim 8 in which the drive means rotates the conveyor rolls in the same direction and rotates the fin roll so that the fins move counter to the surface movement of said conveyor rolls.

10. In an inking system for rotary printing presses: an ink fountain; a rotatable fountain roll operatively associated with said ink fountain; a form roll rotatably mounted on an axis remote from that of the fountain roll; and a train of contacting rolls for transferring ink from the fountain roll to the form roll, said train including a fin ductor roll in contact with the fountain roll and with a distributor roll, said fin ductor roll having a mass of closely circumferentially spaced, longitudinally elongated, flexible, normally radial fins, a plurality of said fins being in contact with each of said rolls; and drive means for rotating said rolls so that the fins sweep the surfaces of the fountain roll and the distributor roll.

11. In an inking system for rotary printing presses; an ink fountain; a rotatable fountain roll operatively associated with said ink fountain; a form roll rotatably mounted on an axis remote from that of the fountain roll; a train of alternate fin rolls and continuous surfaced rolls to transfer ink from the fountain roll to the form roll, including a fin ductor roll in contact with the fountain roll, each of said fin rolls having a mass of closely circumferentially spaced, longitudinally elongated, flexible, normally radial fins, a plurality of said fins being in contact with two continuous surfaced rolls to carry ink from one of said two rolls to the other; and drive means for rotating said rolls so that the fins sweep the surfaces of the rolls with which they are in contact.

References Cited in the file of this patent

UNITED STATES PATENTS

| 1,185,669 | Hoe | June 6, 1916 |
| 1,977,444 | Lamatsch et al. | Oct. 16, 1934 |

FOREIGN PATENTS

| 563,555 | Germany | Nov. 8, 1932 |